US009500758B2

(12) United States Patent
Duret et al.

(10) Patent No.: US 9,500,758 B2
(45) Date of Patent: Nov. 22, 2016

(54) STABILIZATION OF SEISMIC DATA

(71) Applicant: CGG Services SA, Massy (FR)

(72) Inventors: Florian Duret, Massy (FR); Julien Cotton, Massy (FR); Daniel Clarke, West Sussex (GB)

(73) Assignee: CGG SERVICES SA, Massy (FR)

( * ) Notice: Subject to any disclaimer, the term of this patent is extended or adjusted under 35 U.S.C. 154(b) by 49 days.

(21) Appl. No.: 14/427,455

(22) PCT Filed: Sep. 11, 2014

(86) PCT No.: PCT/EP2014/069450
§ 371 (c)(1),
(2) Date: Mar. 11, 2015

(87) PCT Pub. No.: WO2015/036510
PCT Pub. Date: Mar. 19, 2015

(65) Prior Publication Data
US 2016/0170053 A1     Jun. 16, 2016

Related U.S. Application Data

(60) Provisional application No. 61/876,788, filed on Sep. 12, 2013, provisional application No. 61/919,657, filed on Dec. 20, 2013.

(51) Int. Cl.
*G01V 1/36*     (2006.01)
*G01V 1/30*     (2006.01)

(52) U.S. Cl.
CPC .............. *G01V 1/36* (2013.01); *G01V 1/308* (2013.01); *G01V 2210/127* (2013.01); *G01V 2210/612* (2013.01)

(58) Field of Classification Search
CPC .................. G01V 1/308; G01V 1/36; G01V 2210/612; G01V 2210/127
(Continued)

(56) References Cited

U.S. PATENT DOCUMENTS

| 3,603,922 A | 9/1971 | Hair, Jr. et al. ................. 367/43 |
| 6,278,949 B1 | 8/2001 | Alam ............................. 702/16 |

(Continued)

OTHER PUBLICATIONS

International Search Report and Written Opinion, Application No. PCT/EP2014/069450, 10 pages, Mar. 4, 2015.
(Continued)

*Primary Examiner* — Daniel L Murphy
(74) *Attorney, Agent, or Firm* — Patent Portfolio Builders PLLC

(57) ABSTRACT

The present disclosure includes a method for stabilizing controlled seismic signals based on uncontrolled seismic signals. The method includes calculating reconstructed signals associated with a first receiver. Each reconstructed signal is based on uncontrolled signals recorded by a respective pair of receivers that includes the first receiver and a respective second receiver. The method also includes calculating signal variations. Each signal variation is associated with a respective pair of receivers and based on a difference between the reconstructed signal associated with the respective pair of receivers and a reference associated with the respective pair of receivers. The method also includes calculating a stabilization factor for the first receiver based on the first signal variations. The method also includes modifying controlled seismic signals recorded by the first receiver by applying the stabilization factor to the controlled seismic signals. The present disclosure may also include associated systems and apparatuses.

20 Claims, 6 Drawing Sheets

(58) Field of Classification Search
USPC .......................................................... 367/63
See application file for complete search history.

(56) References Cited

U.S. PATENT DOCUMENTS

| | | | |
|---|---|---|---|
| 6,519,205 B1 | 2/2003 | Baeten et al. ................... | 367/45 |
| 7,843,766 B2 | 11/2010 | Levin .............................. | 367/40 |
| 8,417,458 B2 | 4/2013 | Halliday et al. ................ | 702/17 |
| 8,483,964 B2 | 7/2013 | Chu ................................ | 702/11 |

OTHER PUBLICATIONS

Sens-Schonfelder and Wegler, "Passive image interferometry and seasonal variations of seismic velocities at Merapi Volcano, Indonesia", Geophysical Research Letters, vol. 33, No. 21, 5 pages, Nov. 1, 2006.

Forgues et al., "Simultaneous Active/Passive Seismic Monitoring of Steam Assisted Heavy Oil Production", 73rd EAGE Conference & Exhibition Incorporating SPE EUROPEC 2011, pp. 1-5, May 23, 2011.

Wagner et al., "Joint inversion of active and passive seismic data in Central Java", Geophysical Journal International, vol. 170, pp. 923-932, Aug. 2007.

Lu et al., "Application of noise interferometry to obtain time-lapse velocity variations during a steam stimulation cycle at Cold Lake", SEG Technical Program Expanded Abstracts 2009, pp. 1673-1677, Oct. 25, 2009.

Berron et al., "Effects of complex near surface on 4D acquisition with buried source and receiver", SEG Technical Program Expanded Abstracts 2012, pp. 1-5, Sep. 22, 2012.

Ruigrok et al, "Extraction of P-wave reflections from microseisms", Comtes Rendus Geoscience, vol. 343, Issues 8-9, 13 pages, Sep. 2011.

Poupinet et al., "Monitoring Velocity Variations in the Crust Using Earthquake Doublets: An Application to the Calaveras Fault, California", Journal of Geophysical Research, vol. 89, No. B7, pp. 5719-5731, Jul. 10, 1984.

Draganov et al., "Reflection images from ambient seismic noise", Geophysics, vol. 74, No. 5, pp. A63-A67, Sep./Oct. 2009.

Ratdomopurbo and Poupinet, "Monitoring a temporal change of seismic velocity in a volcano: application to the 1992 eruption of Mt. Merapi (Indonesia)", Geophysical Research Letters, vol. 22, No. 7, pp. 775-778, Apr. 1, 1995.

de Cacqueray et al., "Tracking of velocity variations at depth in the presence of surface velocity fluctuations", Geophysics, vol. 78, No. 1, pp. U1-U8, Dec. 11, 2012.

Snieder et al., "Monitoring change in volcanic interiors using coda wave interferometry", Geophysical Research Letters, vol. 31, 5 pages, Nov. 5, 2004.

Frechet et al., "Application of the cross-spectral moving-window technique (CSMWT) to the seismic monitoring of forced fluid migration in a rock mass", International Journal of Rock Mechanics and Mining Science & Geomechanics Abstracts, vol. 26, issues 3-4, pp. 221-233, Jul. 1989.

Wegler and Sens-Schonfelder, "Fault zone monitoring with passive image interferometry", Geophysical Journal International, vol. 168, pp. 1029-1033, 2007.

Office Action in corresponding European Application No. 14 765 924.7 dated Sep. 16, 2016.

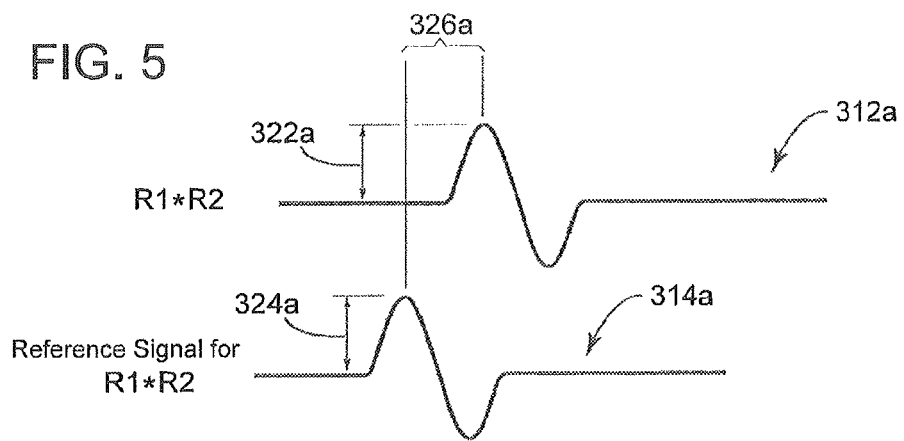
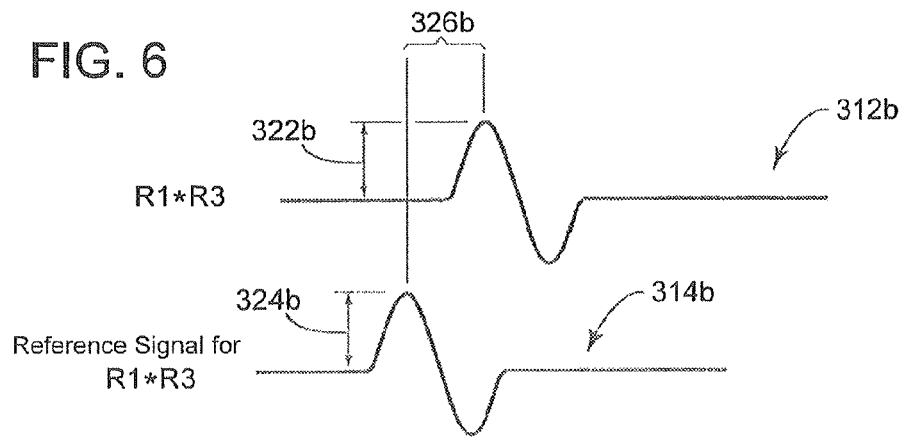

STABILIZATION OF SEISMIC DATA

CROSS-REFERENCE TO RELATED APPLICATION

This application is a U.S. National Stage Application of International Application No. PCT/EP2014/069450 filed Sep. 11, 2014, which claims the benefit of priority under 35 U.S.C. §119 from U.S. Provisional Patent Application Ser. No. 61/919,657, filed on Dec 20, 2013 and U.S. Provisional Patent Application Ser No. 61/876,788, filed on Sep. 12, 2013, which are incorporated by reference in their entirety for all purposes.

TECHNICAL FIELD

The present invention relates generally to seismic imaging and, more particularly, to systems and methods for stabilizing seismic data.

BACKGROUND

Seismic exploration, whether on land or at sea, is a method of detecting geologic structures below the surface of the earth by analyzing seismic energy that has interacted with the geologic structures. A seismic energy source generates a seismic signal that propagates into the earth, where the signal may be partially reflected, refracted, diffracted, and/or otherwise affected by one or more geologic structures such as, for example, interfaces between underground formations having varying acoustic impedances. Seismic imaging systems include one or more sources that can be arranged in various configurations. For example, sources can be placed at or near the earth's surface, on or within bodies of water, or below the earth's surface. Seismic sources can be controlled or uncontrolled. A "controlled source" is a source that deliberately generates seismic signals at the control of the seismic imaging system. A seismic wave that is deliberately generated by a controlled source at the direction of the seismic imaging system is referred to as a "controlled signal" or an "active signal," and the images resulting from the processing of these signals are referred to as "controlled seismic data" or "active seismic data." An "uncontrolled source" is a source that produces a seismic wave that is not deliberately generated by the seismic imaging system. A seismic wave that is generated by an uncontrolled source is referred to as an "uncontrolled signal" or a "passive signal."

Seismic receivers placed at or near the earth's surface, within bodies of water, or below the earth's surface in well-bores are able to detect the seismic signals and record them. The recordings are processed to generate information about the location and physical properties of the subsurface geologic structures that interacted with the seismic signal. A set of recordings taken during a particular time period may be referred to as a "survey." One or more signals recorded from a single survey can be used to generate an image of the subsurface formations. Such images, referred to as "2D images" or "3D images," indicate the state of the subsurface formations during the time period in which the survey was taken. Seismic data can also be gathered at difference times. This type of analysis is referred to as "time-lapse" or "4D" imaging. "Permanent Reservoir Monitoring" (PRM) or "Continuous Reservoir Monitoring" (CRM) is used to perform 4D imaging near a reservoir over an extended period of time, though such implementations need not be permanent or continuous. 4D processing of two seismic datasets recorded at different times facilitates the determination of how and where the Earth's properties have changed during that time period. Seismic datasets recorded at different times are referred to as different "vintages." 3D images from different vintages can be compared to identify differences in the subsurface structures. For example, 3D images from different vintages can be differenced to generate "4D images," which are also referred to as "4D differences" or "4D effects." In 4D imaging, the reference dataset can be referred to as the "baseline" survey or vintage, and the dataset measured against the baseline can be referred to as the "monitor" survey or vintage. 3D and 4D images are typically generated from the recording and processing of controlled signals.

Because 4D images are generated from seismic data acquired at different times, 4D images measure changes in subsurface formations over time. For example, 4D images may be developed in a reservoir before and after a period of production. Such 4D images are used to identify reservoir activity of interest such as, for example, fluid movements or changes in fluid or lithological properties in and around a reservoir. Features of a 4D image related to fluid production may be considered "4D signal" or "4D signature" while other unwanted elements of the image may be considered "4D noise."

One goal of 4D processing is to attenuate 4D noise. In certain systems, 4D noise can be caused by changes in the environmental or seismic imaging equipment over time. For example, changes in temperature, changes in moisture, or shifting particles may change the velocity, amplitude, frequency characteristics, or other aspects of seismic wave propagation. As another example, certain properties of the receivers may change over time, which can affect the recorded signal. Since these changes can distort seismic images, 3D images from different surveys can show differences that result from environmental or equipment changes rather than the structural changes in the layers or reservoir that are relevant to production. 4D images are therefore rendered less accurate by the destabilizing effects of changes in the environment or equipment.

SUMMARY

In accordance with one or more embodiments of the present disclosure, a method for stabilizing controlled seismic signals based on uncontrolled seismic signals is disclosed. The method includes calculating reconstructed signals associated with a first receiver of a plurality of receivers. Each reconstructed signal is based at least on uncontrolled signals recorded by a respective pair of receivers that includes the first receiver and a respective second receiver of the plurality of receivers. The method also includes calculating one or more signal variations. Each signal variation is associated with a respective pair of receivers and is based at least on a difference between the reconstructed signal associated with the respective pair of receivers and a reference associated with the respective pair of receivers. The method also includes calculating a stabilization factor for the first receiver based at least on the one or more signal variations. The method also includes modifying one or more controlled seismic signals recorded by the first receiver by applying the stabilization factor to the one or more controlled seismic signals.

In accordance with another embodiment of the present disclosure, a system for stabilizing controlled seismic signals based on uncontrolled seismic signals is disclosed. The system includes a plurality of receivers and a computer system. The computer system is configured to calculate reconstructed signals associated with a first receiver of a plurality of receivers. Each reconstructed signal is based at least on uncontrolled signals recorded by a respective pair of receivers that includes the first receiver and a respective second receiver of the plurality of receivers. The computer system is further configured to calculate one or more signal variations. Each signal variation is associated with a respective pair of receivers and is based at least on a difference between the reconstructed signal associated with the respective pair of receivers and a reference associated with the respective pair of receivers. The computer system is further configured to calculate a stabilization factor for the first receiver based at least on the one or more signal variations. The computer system is further configured to modify one or more controlled seismic signals recorded by the first receiver by applying the stabilization factor to the one or more controlled seismic signals.

In accordance with another embodiment of the present disclosure, a non-transitory, computer-readable medium containing instructions for stabilizing controlled seismic signals based on uncontrolled seismic signals is disclosed. The instructions are operable, when executed by a processor, to calculate reconstructed signals associated with a first receiver of a plurality of receivers. Each reconstructed signal is based at least on uncontrolled signals recorded by a respective pair of receivers that includes the first receiver and a respective second receiver of the plurality of receivers. The instructions are further operable to calculate one or more signal variations. Each signal variation is associated with a respective pair of receivers and is based at least on a difference between the reconstructed signal associated with the respective pair of receivers and a reference associated with the respective pair of receivers. The instructions are further operable to calculate a stabilization factor for the first receiver based at least on the one or more signal variations. The instructions are further operable to modify one or more controlled seismic signals recorded by the first receiver by applying the stabilization factor to the one or more controlled seismic signals.

BRIEF DESCRIPTION OF THE DRAWINGS

For a more complete understanding of the present invention and its features and advantages, reference is now made to the following description, taken in conjunction with the accompanying drawings, which may include drawings that are not to scale and wherein like reference numbers indicate like features, in which:

FIG. 5 illustrates an example reconstructed seismic signal and an example reference signal that may be used in certain embodiments of the present disclosure;

FIG. 6 illustrates an example reconstructed seismic signal and an example reference signal that may be used in certain embodiments of the present disclosure;

DETAILED DESCRIPTION

Figure 1:
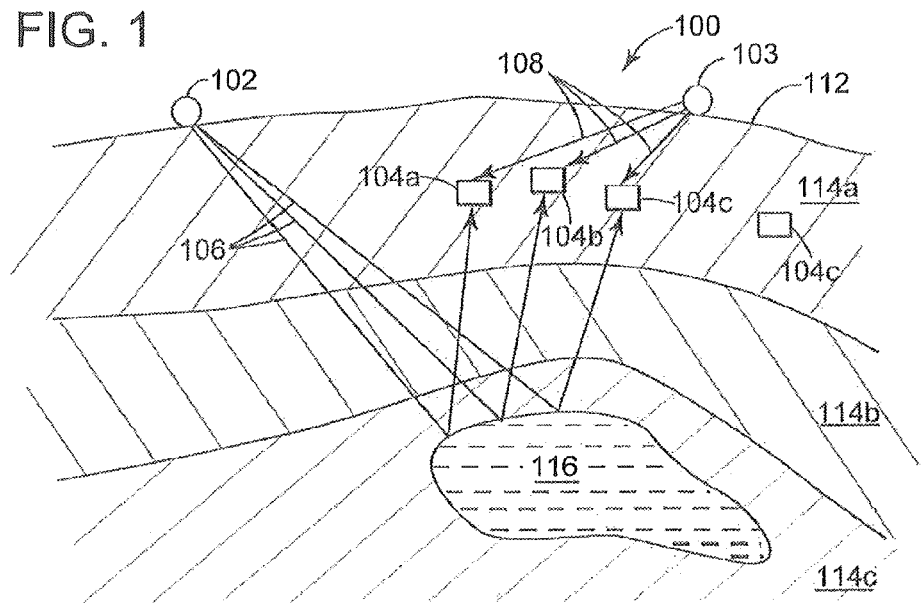
FIG. 1 illustrates a cross-sectional view of an example seismic imaging system in accordance with some embodiments of the present disclosure.

Some embodiments of the present disclosure provide improved stabilization of seismic data by adjusting controlled signals based on the analysis of uncontrolled signals. Controlled signals and uncontrolled signals are recorded at the same or similar times, and the uncontrolled signals are analyzed to determine how seismic waves recorded by particular receivers are distorted relative to a reference level. As explained above, changes in the environment or seismic imaging equipment over time can affect properties of the seismic waves and the resulting recordings. Because the analysis of the uncontrolled signals discussed in the present disclosure indicates where and how seismic waves are affected by these changes at a particular time, it can be used to modify controlled signals that were recorded near that time to adjust for the distortional effects caused by the environmental or equipment-related changes. Thus, when taking repeated surveys, adjusting the controlled signals from each survey based on signal variations observed in the uncontrolled signals stabilizes the seismic data to provide a more accurate picture of changes in subsurface formations that are relevant to reservoir production.

Controlled signals can be stabilized by applying stabilization factors, which are based on the analysis of the uncontrolled signals, to the controlled signals at any suitable point during the imaging process. The stabilization factor can be an amplitude scalar (to adjust for amplitude variations), a time delay (to adjust for velocity variations), a complex operator (to adjust phase and amplitude for multiple frequencies of the recorded bandwidth), any other type of factor that can be used to modify seismic data, or any suitable combination thereof. In some embodiments, the uncontrolled signals recorded by various receiver pairs are analyzed to generate reconstructed signals. Each reconstructed signal is associated with a particular receiver pair. For example, for a given receiver, R, the uncontrolled signal recorded by R can be compared (e.g., cross-correlated) with uncontrolled signals recorded by one or more other receivers to generate one or more reconstructed signals. Each of these calculations yields a reconstructed signal that is associated with a receiver pair (i.e. R and the paired receiver). Each reconstructed signal can then be compared to a reference level associated with the receiver pair to determine a signal variation for the receiver pair, and these signal variations can be used to calculate a stabilization factor for R. The stabilization factor for R can then be applied to controlled signals received by R to adjust for amplitude variations, velocity variations, or other types of signal variations caused by the state of the survey site at the time the controlled signals were recorded. This process can be repeated for other receivers, resulting in different stabilization factors for each receiver.

Furthermore, the entire process can be performed repeatedly, resulting in different sets of stabilization factors that can be applied to controlled signals recorded during different time windows. Controlled seismic signals can therefore be adjusted based on uncontrolled seismic signals to stabilize seismic imaging during repeated or continuous monitoring of a survey site.

FIG. 1 illustrates a cross-sectional view of a seismic imaging system 100 that may be used to stabilize controlled signals based on uncontrolled signals as described above. In the illustrated embodiment, system 100 includes controlled source 102 and receivers 104. Receivers 104 may record seismic signals generated by controlled sources 102 and uncontrolled sources 103. System 100 is located in an area that includes surface 112, layers 114, and reservoir 116. Although FIG. 1 depicts a land implementation of system 100, embodiments of the present disclosure may also be used in marine environments (as shown, for example, in FIG. 6), transition zones (as shown, for example, in FIG. 7), or in any other environment where seismic imaging is performed.

System 100 analyzes uncontrolled signals 108 generated by uncontrolled sources 103 to calculate stabilization factors that can be applied to controlled signals 106 to adjust for signal variations observed in uncontrolled signals 108. System 100 may be any collection of systems, devices, or components configured to detect, record, and/or process seismic data. System 100 includes one or more controlled sources 102 and one or more receivers 104. Seismic waves (such as, for example, acoustic wave trains) propagate out from one or more controlled sources 102 and may be partially reflected, refracted, diffracted, or otherwise affected by one or more subsurface structures such as rock layers beneath the earth's surface. These waves are ultimately recorded by one or more receivers 104 and processed to generate images of the subsurface. As explained above, surveys taken at different times can be compared to generate 4D images that show changes in subsurface formations over time. System 100 may also record and process uncontrolled signals 108 to calculate stabilization factors that can be applied to controlled signals 106 at any point during the imaging process. Stabilizing controlled seismic data based on uncontrolled seismic data in this manner provides improved 4D imaging that emphasizes 4D signal and provides a clearer picture of subsurface changes that are relevant to reservoir production.

Controlled sources 102 may be any devices that generate controlled seismic waves that are used to generate images of geological structures. Controlled source 102, which can be impulsive or vibratory, generates controlled signals 106. In particular embodiments, controlled source 102 can be a seismic vibrator, vibroseis, dynamite, air gun, thumper truck, or any other suitable seismic energy source. Source 102 may utilize electric motors, counter-rotating weights, hydraulics, or any other suitable structure configured to generate seismic energy. System 100 can have any suitable number, type, configuration, or arrangement of controlled sources 102. For example, system 100 can include multiple controlled sources 102 that operate in conjunction with one another. In such embodiments, controlled sources 102 can be operated by a central controller that coordinates the operation of multiple controlled sources 102. As another example, controlled sources 102 may be located on surface 112, above surface 112, or below surface 112. Furthermore, in some embodiments, a positioning system may be utilized to locate, synchronize, or time-correlate sources 102. For example, some embodiments utilize a Global Navigation Satellite System (GNSS) such as, for example, the Global Positioning System (GPS), Galileo, the BeiDou Satellite Navigation System (BDS), GLONASS, or any suitable GNSS system. Additional structures, configurations, and functionality of controlled sources 102 are described below with respect to FIG. 10.

Uncontrolled source 103 may be any object, location, or event that emits incidental seismic waves that are not deliberately triggered by system 100. For example, uncontrolled sources 103 can be natural phenomena such as rain, waves, earthquakes, volcanic eruptions, or any other natural event that generates seismic waves. Uncontrolled sources 103 can also be anthropogenic objects or events such as, for example, cars, boats, drilling or pumping-related activity or machinery, or any human-related events. Uncontrolled sources 103 may be transitory or permanent and may be stationary or mobile. Uncontrolled signals 108 may be generated from any number or type of uncontrolled source 103, and uncontrolled sources 103 may have any location relative to receivers 104 that allows their emissions to be recorded.

Receivers 104 may be any devices that are operable to record seismic waves. Receivers 104 convert seismic energy into recorded signals, which may have any suitable format. For example, receivers 104 can record seismic waves as analog signals or digital signals. As a particular example, certain embodiments of receiver 104 convert seismic energy to electrical energy, allowing seismic waves to be recorded as electrical signals such as, for example, voltage signals, current signals, or any suitable type of electric signal. Other embodiments of receiver 104 record seismic energy as an optical signal or any suitable type of signal that corresponds to the received seismic energy. The resulting signals are transmitted to and recorded by recording units that may be local or remote to receivers 104. Recordings may then be communicated to computer system 200 for processing, as described further below with respect to FIG. 10. As explained above, certain physical properties of receivers 104 may change over time, which may cause changes in the measured signals. Dynamically stabilizing measured signals as described herein may provide improved seismic imaging by adjusted recordings to correct for such changes.

System 100 may utilize any suitable number, type, arrangement, and configuration of receivers 104. For example, system 100 may include dozens, hundreds, thousands, or any suitable number of receivers 104. As another example, receivers 104 may have any suitable arrangement, such as linear, grid (as shown, for example, in FIG. 2), array, or any other suitable arrangements, and spacing between receivers 104 may be uniform or non-uniform. Furthermore, receivers 104 may be located at any suitable position. For example, receivers 104 may be located on surface 112, above surface 112, or below surface 112. Furthermore, in off-shore embodiments, receivers 104 may also be located at any suitable depth within the water. Receivers 104 may also include any structure, configuration, or function described below with respect to FIGS. 8-10.

Receivers 104 may record seismic waves during periods when controlled sources 102 are generating controlled signals 106. Such periods may be referred to as periods of active acquisition. During periods of active acquisition, receivers 104 may record both controlled and uncontrolled signals. Receivers 104 may also record seismic waves when controlled sources 102 are not active. Such periods may be referred to as periods of passive acquisition. During such recording periods, receivers 104 record primarily uncontrolled signals. In some embodiments, receivers 104 may record for extended periods of time. Such recordings may span days, months, or years. Such recordings may be continuous or periodic during this span of time. In some embodiments, recordings made by the same receivers 104 at different times may be used to calculate 4D images that depict apparent changes in the survey area over time. Furthermore, seismic waves recorded by receivers 104 may be communicated to computer system 200 for processing, as described further below with respect to FIG. 10.

Controlled signals 106 represent portions of seismic waves generated by controlled source 102 that arrive at receivers 104. Controlled signals 106 may be body waves or surface waves, and controlled signals 106 can reach receivers 104 after travelling various paths. For example, these waves can pass straight to receivers 104, or they can reflect, refract, diffract, or otherwise interact with various subsurface structures. However, for purposes simplified illustration, only three particular paths are shown. After being recorded by receivers 104, controlled signals 106 can be modified by the stabilization factors at any point during the processing sequence.

Uncontrolled signals 108 represent portions of seismic waves generated by uncontrolled source 103 that arrive at receivers 104. Uncontrolled signals 108 may be body waves or surface waves, and uncontrolled signals 108 can reach receivers 104 after travelling various paths. For example, these waves can pass straight to receivers 104, or they can reflect, refract, diffract, or otherwise interact with various subsurface structures. Again, however, for purposes simplified illustration, only three particular paths are shown. After being recorded by receivers 104, uncontrolled signals 108 are used to compute reconstructed signals for the receivers pairs, and the reconstructed signals are compared to a reference (e.g., a reference signal or a reference value) to determine signal variations for the receiver pair. Based on the signal variations for one or more receiver pairs that include a given receiver, a stabilization factor for that receiver is computed. This stabilization factor is then applied to controlled signals recorded by that receiver to adjust for signal variations observed in the uncontrolled signals. This process can be repeated for each receiver 104. For example, where controlled signals 106 are recorded within the same time window as uncontrolled signals 108 (e.g., at the same time or within the same day, week, month, year, or any other suitable time window), system 100 can compute different stabilization factors for receivers 104a-104c based on uncontrolled signals 108a-108c. The stabilization factor for receivers 104a-104c can then be applied to controlled signals 106a-106c, respectively, at any point during the imaging process.

Various embodiments may use any suitable techniques for processing seismic data. For example, in some embodiments, after controlled signals 106 are recorded by receivers 104, the data is collected and organized based on offset distances, such as the distance between a particular controlled source 102 and a particular receiver 104 or the amount of time it takes for signals 106 to reach receivers 104. The amount of time a signal takes to reach a receiver 104 may be referred to as the "travel time." Data collected during a survey by a particular receiver 104 may be referred to as a "trace," and multiple traces may be gathered, processed, and utilized to generate a model of the subsurface structure. A "gather" refers to any set of seismic data grouped according to a common feature. For example, a series of traces reflected from the same common subsurface point may be referred to as a common midpoint gather (CMP). Other examples of gathers include common conversion point (CCP) gather, a common shot gather (one source 102 or shot received by multiple receivers 104), common receiver gather (multiple sources 102 received by one receiver 104) (CRG), or any other suitable type of gather based on the implementation or goals of the processing. The traces from a gather may be summed (or "stacked"), which may improve the signal-to-noise ratio (SNR) over a "single-fold" stack because summing tends to cancel out incoherent noise. A "fold" indicates the number of traces in a gather. Additional processing techniques may also be applied to the controlled signals to further improve the resulting images. As explained above, the stabilization factors can be applied to the controlled signals at any suitable point during the imaging process. For example, stabilization can be performed on pre-stack or post-stack data. As another example, stabilization can be performed before, during, or after various noise-attenuation processes.

Surveys can be conducted in any suitable area, including on-shore locations, offshore locations, transition zones, or any other suitable area. Such areas may or may not be utilized for production during the survey period. For example, the survey area may include a reservoir 116 that is being actively developed, and surveys may be conducted continuously or periodically during the period of production. Stabilizing seismic data in such embodiments provides more accurate information about changes in and around reservoir 116 that are relevant to production. Such information may improve production efficiency, reduce costs, and provide other benefits related to reservoir production.

Surface 112 represents the surface of area 110. Surface 112 may be an air-earth boundary or a water-earth boundary depending on the location of area 110. Surface 112 may reflect seismic waves generated by sources 102, which may cause receivers 104 to record waves that have reflected multiple times. Signals from waves that have reflected multiple times may be referred to as "multiples."

Layers 114 represent geological layers of area 110. Area 110 may have any number, composition, and/or arrangement of layers 114. Body waves may be refracted, reflected, or otherwise affected when traveling through layers 114, particularly at the interfaces between different layers 114. Surface waves may also be attenuated, dispersed, or otherwise affected by geological structures during propagation. Layers 114 may have various densities, thicknesses, or other characteristics that may affect seismic wave propagation. In the illustrated embodiments, layer 114a is a near-surface layer, which may be more severely affected by environmental changes. For example, factors such as changes in temperature, changes in moisture, and shifting particles may change the velocity, amplitude, or other aspects of wave propagation, and certain of these factors may disproportionately affect near-surface layers. However, non-weathering layers are also affected by these types of distortion-causing changes. Such changes may hinder the ability of 4D images to reflect the structural changes that are relevant to reservoir exploration or production such as, for example, reservoir changes or shifting of layers 114. Dynamically stabilizing measured signals as described herein may provide improved seismic 4D imaging by correcting for unwanted changes in the wave propagation characteristics of layers 114.

Reservoir 116 may be any geological formation targeted for production. For example, reservoir 116 may contain oil, gas, or any other targeted material. In embodiments involving actively producing reservoirs 116, reservoir production may cause changes to reservoir 116 (such as, for example, fluid displacement) or the surrounding layers 114 that may affect the optimal exploration or production strategy.

Dynamically stabilizing measured signals as described herein may reduce costs, improve production, and improve safety by providing more accurate depictions of the changes in area 110 over time.

Figure 2:
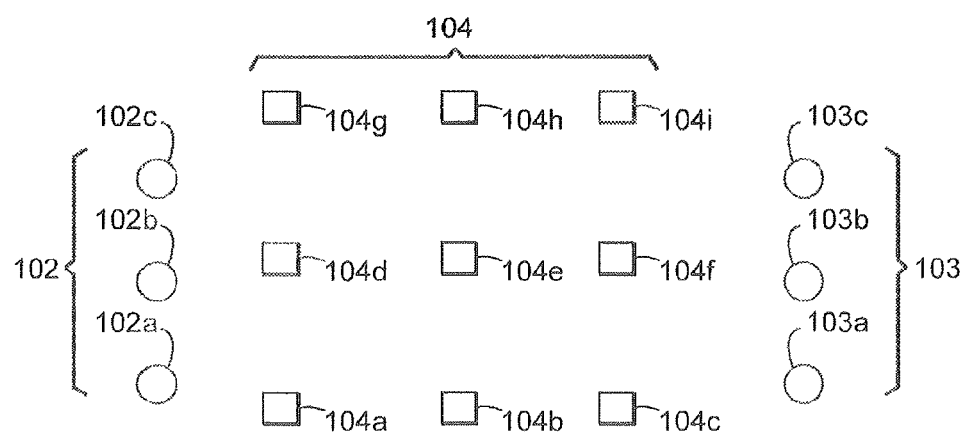
FIG. 2 illustrates a plan view of an example seismic imaging system in accordance with some embodiments of the present disclosure.

FIG. 2 illustrates a plan view of an example configuration of system 100. As shown in FIG. 2, receivers 104 may be arranged in a grid at different distances and at different lateral offsets from controlled sources 102. Some embodiments may also utilize receivers 104 at different depths, providing a three-dimensional array of receivers 104. Controlled sources 102 may be located along an axis of receivers 104 or off such axes. Various embodiments may use any suitable number, type, configuration, and/or arrangement of controlled sources 102 and receivers 104. For example, controlled sources 102 and receivers 104 may have organized positions or more random positions.

Figure 3:
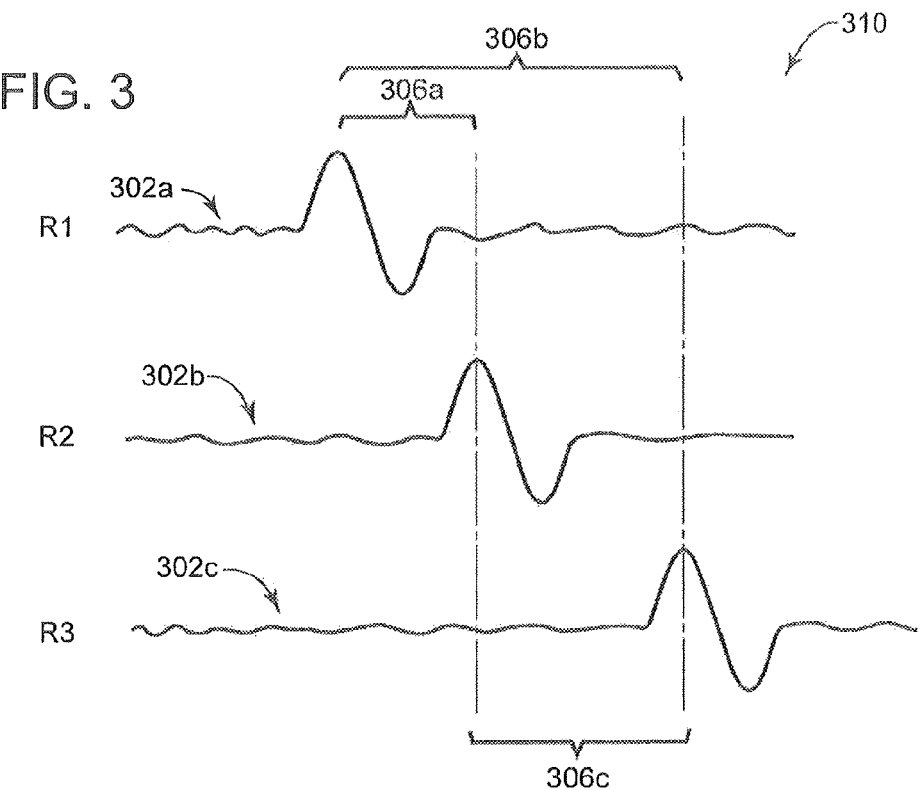
FIG. 3 illustrates example seismic signals that may be recorded by certain embodiments of the present disclosure.

FIG. 3 illustrates a graph of example seismic signals that may be recorded by certain embodiments of the present disclosure. Graph 300-depicts signals 302, which may be uncontrolled signals recorded by receivers 104. Signals 302a-302c represent signals recorded by receivers R1, R2, and R3, respectively. Signals 302 include both coherent and incoherent portions. Time lags 306 represents the time lag between the coherent portions of signals 302. Time lag 306a represents the time lag between the coherent portions of signals 302a and 302b, and time lag 306b represents the time lag between the coherent portions of signals 302a and 302c. Similarly, time lag 306c represents the time lag between coherent portions of signals 302b and 302c. The extent of time lag 306 may depend on factors such as the distance between receivers 104, the location of controlled source 102, and the physical properties of the medium, which may affect wave velocity, amplitude, and other properties. Changes in these physical properties over time may cause similar source emissions to yield recorded signals with different amplitudes or time lags. Once signals 302 have been recorded, passive wavefield reconstruction may be performed as shown, for example, in FIG. 4.

Figure 4:
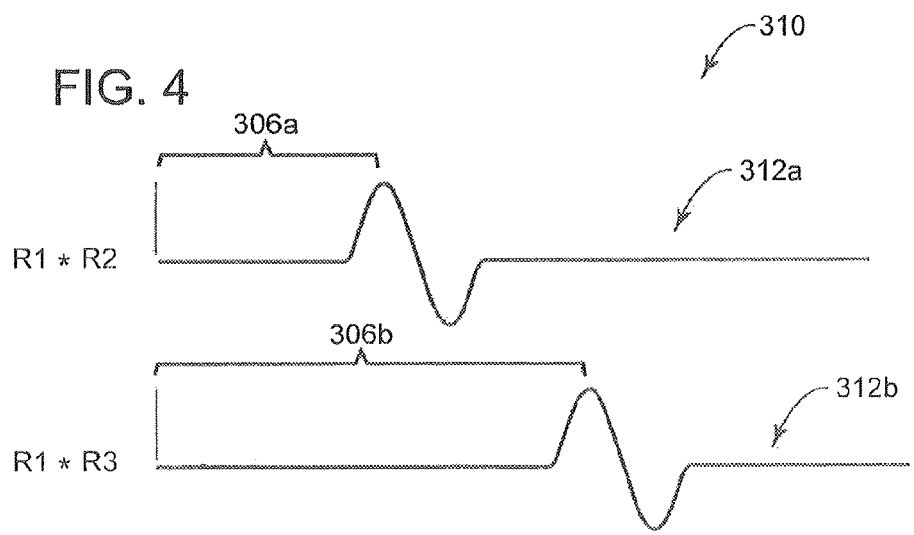
FIG. 4 illustrates an example correlogram that may be used certain embodiments of the present disclosure.

FIG. 4 illustrates a correlogram that may be used to calculate signal variations associated with receiver pairs. Correlogram 310 depicts reconstructed signals 312, which were calculated based on signals 302. Reconstructed signal 312a is based on the cross-correlation of signals 302a and 302b (i.e. the R1-R2 receiver pair). Reconstructed signal 312b is based on the cross-correlation of signals 302a and 302c (i.e. the R1-R3 receiver pair). Cross-correlation of signals 302 isolates coherent signal and results in a reconstructed signal that mimics a signal having receiver 104 as the source. Reconstructed signals can therefore adjust for the unknown point of origin of an uncontrolled signal. Other embodiments may use convolution, deconvolution, or other suitable operations instead of cross-correlation. Furthermore, analogous reconstruction operations can be performed for any pair of receivers 104. Reconstructed signals 312 are used to calculate signal variations associated with receiver pairs as explained below with respect to FIGS. 5 and 6.

FIGS. 5 and 6 illustrate examples of reconstructed seismic signals and associated reference signals that can be used to calculate signal variations. Reference signals 314 can be any signal that serves as a reference point for calculating signal variations for a particular receiver pair. In some embodiments, reference signal 314 is a previously recorded signal. In other embodiments, reference signal 314 is reconstructed signal 312 that was generated at an earlier time period. For example, when a 4D signal is being generated using a particular baseline survey, reference signals 314 can be reconstructed signals 312 that were generated from that baseline survey. In other embodiments, reference signals 314 may be computed using any suitable calculations. For example, reference signals 314 can be an average, median, or other computation based on multiple signals such as, for example, previously calculated reconstructed signals. Furthermore, any additional processing methods can be applied to reference signals 314. In some embodiments, signal variations are computed by comparing amplitude, time delay, or other values of reconstructed signals 312 to reference values directly rather than comparing the signals themselves. Again, these calculations can be performed in the time domain or the frequency domain.

FIG. 5 illustrates reconstructed signal 312a, which corresponds to the receiver pair of R1 and R2, and reference signal 314a, which is also associated with the R1-R2 receiver pair. Reconstructed signal 312a has amplitude 322a, and reference signal 314a has amplitude 324a. The difference between amplitudes 322a and 324a indicates an amplitude variation relative to the reference level for the R1-R2 receiver pair. Furthermore, reconstructed signal 312a and reference signal 314a have time delay 326a, which indicates a velocity variation relative to the reference level for the R1-R2 receiver pair. While the signal variation analysis of FIG. 5 is presented in the time domain, other embodiments may perform this analysis in the frequency domain.

Similarly, FIG. 6 illustrates reconstructed signal 312b, which corresponds to the receiver pair of R1 and R3, and reference signal 314b, which is also associated with the R1-R3 receiver pair. Reconstructed signal 312b has amplitude 322b, and reference signal 314b has amplitude 324b. The difference between amplitudes 322b and 324b indicates an amplitude variation relative to the reference level for the R1-R3 receiver pair. Furthermore, reconstructed signal 312b and reference signal 314b have time delay 326b, which indicates a velocity variation relative to the reference level for the R1-R3 receiver pair. Again, while the signal variation analysis of FIG. 6 is presented in the time domain, other embodiments may perform this analysis in the frequency domain.

Some embodiments calculate stabilization factors for a given receiver based on signal variations of one or more receiver pairs that include the receiver. The stabilization factor for the given receiver can be calculated based on signal variations of all receiver pairs related to the receiver, or it can be calculated based on any suitable subset of these signal variations. The stabilization factor can be computed as an average, median, or any other suitable computation. Stabilization factors computed as averages can be filtered averages, weighted averages, or any other suitable type of average. Furthermore, the averages can be averages by azimuth, averages by offset, averages by region, or averages by any other suitable criteria. As a particular example, the signal variations illustrated in FIGS. 5 and 6 each relate to receiver pairs that include R1. A stabilization factor for R1 can therefore be computed based on signal variations from reconstructed signal 312a, signal variations from reconstructed signal 312b, signal variations from reconstructed signals 312a and 312b, or any suitable set of signal variations related to receivers pairs that include R1.

Figure 7:
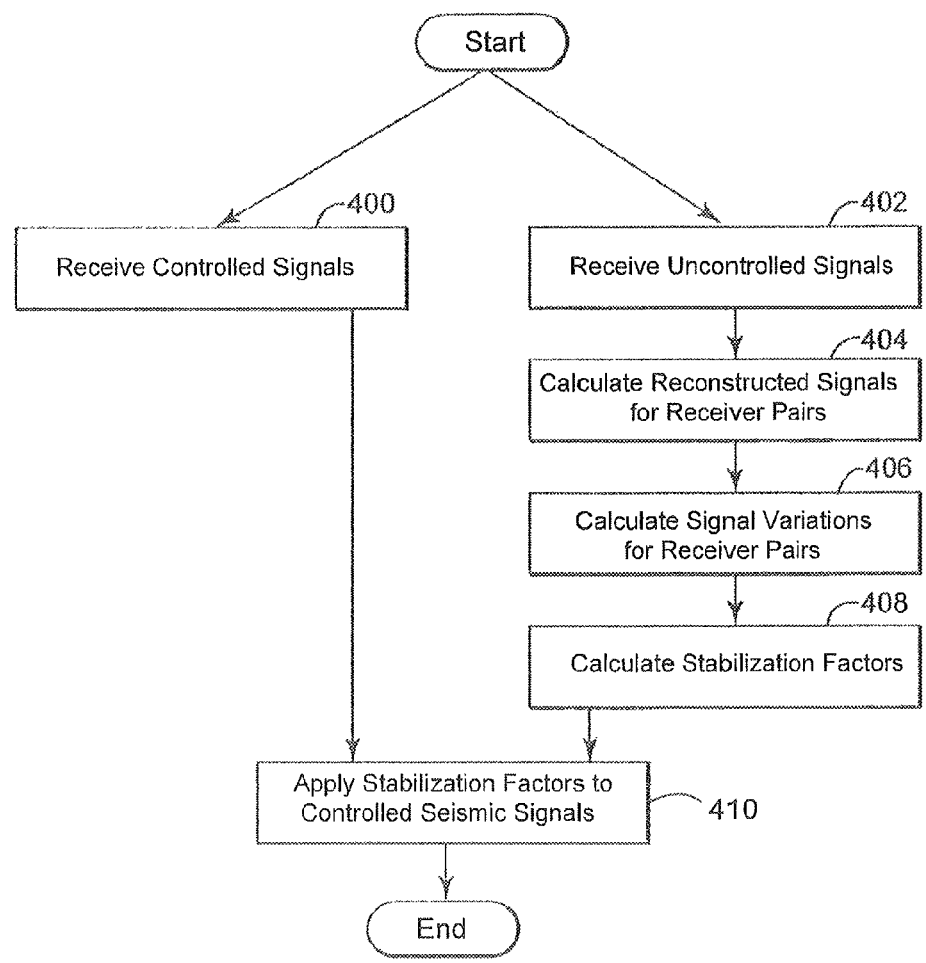
FIG. 7 illustrates a flow chart of an example method for stabilizing controlled signals based on passive seismic signals in accordance with some embodiments of the present disclosure.

FIG. 7 illustrates a flow chart of an example method for stabilizing controlled seismic signals based on uncontrolled seismic signals. This sequence is provided as an example, and various embodiments may perform all, some, or none of these steps. Furthermore, certain embodiments may perform different steps in addition to or in place of the illustrated steps discussed below. This sequence may also be repeated any suitable number of times to provide seismic data stabilization for multiple surveys performed at different time periods.

At step 400, controlled signals are recorded by receivers 104. At step 402, uncontrolled signals are recorded by receivers 104. The controlled and uncontrolled signals may be recorded simultaneously or at different times. For example, system 100 can alternate between periods of active acquisition and passive acquisition. Even when the controlled and uncontrolled signals are not recorded at the same time, they may still be considered to have been recorded within the same time window. For example, signals recorded a day, week, month, year, or any suitable amount time apart may be considered to be within the same time window in certain embodiments. The granularity of these time windows may depend upon the frequency with which signal acquisition periods are repeated. Controlled signals are stabilized by applying stabilization operators that are calculated based on the uncontrolled signals recorded from the same time window as the controlled signals.

At step 404, system 100 calculates reconstructed signals for pairs of receivers 104. The reconstructed signal for a pair of receivers 104 is based on a comparison of the uncontrolled signals recorded by the receivers. For example, some embodiments calculate reconstructed signals by cross-correlating the uncontrolled signals. Other embodiments use convolution, deconvolution, or any other suitable calculation. Reconstructed signals can be calculated for every possible receiver pair, or they can be calculated for any suitable subset of the possible receiver pairs. In some embodiments, the reconstructed signal is a reconstructed body wave or a reconstructed surface wave. Furthermore, in some embodiments, the length of a reconstructed signal is equal or substantially similar to the duration of an active acquisition sequence. In other embodiments, the reconstructed signals may have any suitable duration. A reconstructed signal may be a single reconstructed signal or a collection of multiple reconstructed signals corresponding to a portion of the uncontrolled signal. As used herein, the length of reconstructed signal may be the length of a single reconstructed signal or a sum of multiple reconstructed signals. For example, where the full length of the recorded passive seismic signal is L, a reconstructed signal may be a sum of N reconstructed signals, each having a duration of L/N. In such embodiments, the component reconstructed signals can also have different durations from one another.

Calculating the reconstructed seismic signal may also involve performing one or more preprocessing steps. In such embodiments, the reconstructed seismic signals are calculated based on the output of the preprocessing steps. Preprocessing steps that may be used include data beamforming, velocity filtering, or any suitable method of preprocessing seismic signals prior to calculating reconstructed signals. Data beamforming operates to orient receivers 104 toward a preferred wave origin. Velocity filtering removes certain unwanted waves or portions of waves (such as, for example, slower waves) from the analysis, or it may select and keep certain waves of interest. Velocity filtering includes F-K filtering, radon filtering, or any suitable velocity filtering method.

At step 406, system 100 calculates signal variations for receiver pairs. A respective signal variation can be calculated for each possible receiver pair or a subset thereof. For a given receiver pair, the signal variation is calculated based on a difference between the reconstructed signal associated with that receiver pair and a reference associated with that receiver pair. Signal variations may include velocity variations, amplitude variations, or any variation corresponding to a difference between properties of a reconstructed signal and a reference signal. Where the signal variations includes velocity variations, the velocity variations may be surface wave group or phase velocity variations, refracted body wave velocity variations, reflected body wave velocity variations, or any suitable type of velocity variation. Furthermore, some embodiments may operate in the frequency domain following spectral division at any suitable point during the signal processing sequence. Spectral division results in a complex number that carries information on both the phase and the amplitude of the signal. In such embodiments, reconstructed signals are broken down into different frequencies or frequency ranges, and system 100 may calculate signal variations for each constituent frequency range. Furthermore, receivers can have a separate stabilization operators for each sampled frequency.

Since each reconstructed signal corresponds to two receivers 104, a velocity variation indicates a difference between (1) the apparent velocity of the reconstructed signal between the two receivers during the time window when the uncontrolled signals were recorded and (2) the reference velocity between the two receivers. The velocity variation therefore quantifies the change in wave velocity between the two receivers during this time window relative to a reference level. For example, if weather or other factors have caused the medium between two receivers 104 to propagate seismic waves faster at a particular point in time, then 4D signals capturing that time period may have a distorted picture of the geological changes in area 110. The velocity variation, however, allows system 100 to adjust the controlled signals to account for the change in velocity that was occurring in that region during the relevant time period. Calculating the velocity variations therefore provides more accurate seismic images.

Similar to velocity variations, an amplitude variation indicates a difference between (1) the amplitude of the reconstructed signal during the time window in which the uncontrolled signals were recorded and (2) the reference amplitude associated with the receiver pair. The amplitude variations therefore quantify the change in the amplitude associated with receiver pairs during this time window relative to a reference level. For example, if weather or other factors cause to seismic signals to have larger (or smaller) decreases in amplitude as they pass between two receivers, then 4D signals may have a distorted picture of the geological changes. Amplitude variations calculated by some embodiments thus enable adjustment of controlled signals to correct for amplitude variations observed in the uncontrolled signals. In embodiments using spectral division, each amplitude variation may be calculated for a particular frequency or frequency range.

Signal variations may be calculated directly from the comparison between reconstructed signals and references, or system 100 can perform one or more intermediate steps. For example, system 100 may explicitly calculate velocities or amplitudes and then compare these to reference velocities or amplitudes. Alternatively, system 100 may compare reconstructed signals to reference signals to derive signal variations relative to the reference. Signal variations may be calculated using any suitable method, such as, for example, Moving-Window Cross-Spectral analysis, which operates in the frequency domain, and/or Passive Image Interferometry, which operates in the time domain. Other embodiments calculate signal variations without computing intermediate signal values. For example, velocity variations and amplitude variations can be calculated directly without explicitly calculating velocities and amplitudes.

Signal variations are calculated relative to a reference, which may be a reference signal, a reference value, or any other suitable reference. In some embodiments, a reference signal for a receiver pair may be selected from previously recorded and/or processed data. In other embodiments, the reference signals may be an average of the reconstructed signals. Such averages may be filtered averages, weighted averages, or any other suitable type of average. For example, system 100 may repeatedly update the reference state based on the reconstructed signals calculated during repeated iterations of the stabilization sequence shown in FIG. 7. Other embodiments may determine a reference state using any suitable selection and/or calculation.

At step 408, system 100 calculates a stabilization factor based at least on the signal variations. In embodiments where each signal variation is related to a respective receiver pair, the stabilization factor for a particular receiver can be calculated based on one or more signal variations associated with receiver pairs that include that receiver. For example, the stabilization factor for a particular receiver can be calculated based on all or a subset of the signal variations for receiver pairs that include the particular receiver. This calculation can be an average, median, or any other suitable computation. Stabilization factors computed as averages can be filtered averages, weighted averages, or any other suitable type of average. Furthermore, the averages can be averages by azimuth, averages by offset, averages by region, or averages by any other suitable criteria. In certain embodiments, the calculation of the stabilization factor for a particular receiver can be an inversion process that estimates the stabilization factor over a regular grid covering the area of interest. In some embodiments, intermediate stabilization factors can be calculated for individual receiver pairs, and the stabilization factor for a particular receiver can be calculated based on one or more intermediate stabilization factors related to receiver pairs that include the particular receiver. This calculation can be done in an analogous manner to the calculation of the stabilization factor based on signal variations.

In some embodiments, the stabilization factor is a single mathematical operator that can be applied to controlled signals to account for the signal variations detected in the uncontrolled signals. For example, the stabilization factor can be a complex operator that adjusts both phase and amplitude of the controlled signals. In other embodiments, the stabilization factor may include multiple operators, each corresponding to a particular property of the seismic waves. For example, the stabilization factor may include separate velocity and amplitude operators. The stabilization factor may include any suitable number of functions or parameters.

At step 410, computer system 200 applies the stabilization factors to controlled signals recorded during step 400. As explained above, these controlled signals are recorded within the same time window as the uncontrolled signals recorded during step 402. Applying the stabilization factor may cause one or more types of signal adjustment including spectral division, time shifting, or amplitude adjustments. The application of stabilization factors to controlled signals can be performed in the time domain or in the frequency domain. In embodiments where stabilization is performed in the frequency domain, each frequency range in the measured bandwidth can have a separate stabilization factor.

After performing step 410, system 100 may iterate through the above steps multiple times. Receivers 104 may therefore be periodically or continuously recording and processing uncontrolled signals. Furthermore, in some embodiments, repeated iterations of the above steps may allow system 100 to update one or more references based on newly recorded data, and these references can be used as the reference state for calculating subsequent signal variations. For example, system 100 may update one or more reference signals based on reconstructed signals calculated during subsequent iterations of the stabilization sequence. In some embodiments, stabilization factors are associated with a particular receiver and a particular time window, and each stabilization factor is applied to controlled signals recorded by that particular receiver during that time window. Calculating and applying stabilization factors during repeated or continuous seismic monitoring adjusts the controlled signals to correct for variations detected in uncontrolled signals recorded by the relevant receiver during the relevant time window. Processing seismic data in this manner therefore stabilizes controlled signals during repeated or continuous acquisition cycles so that 4D images more accurately reflect the state of the subsurface geology, which may improve the effectiveness and efficiency of reservoir production operations and reduce costs.

Various embodiments may perform some, all, or none of the steps described above. For example, certain embodiments may omit step 406 and calculate stabilization factors directly from reconstructed signals without explicitly calculating signal variations. Furthermore, certain embodiments may perform certain steps in different orders or in parallel, and certain embodiments may modify one or more steps. For example, multiple sets of uncontrolled signals may be recorded or processed in parallel. Moreover, one or more steps may be repeated. Additionally, while system 100 has been described as performing these steps, any suitable component of system 100 may perform one or more steps. For example, computer system 200 (shown in FIG. 10) may perform all or some of the steps described above.

Figure 8:
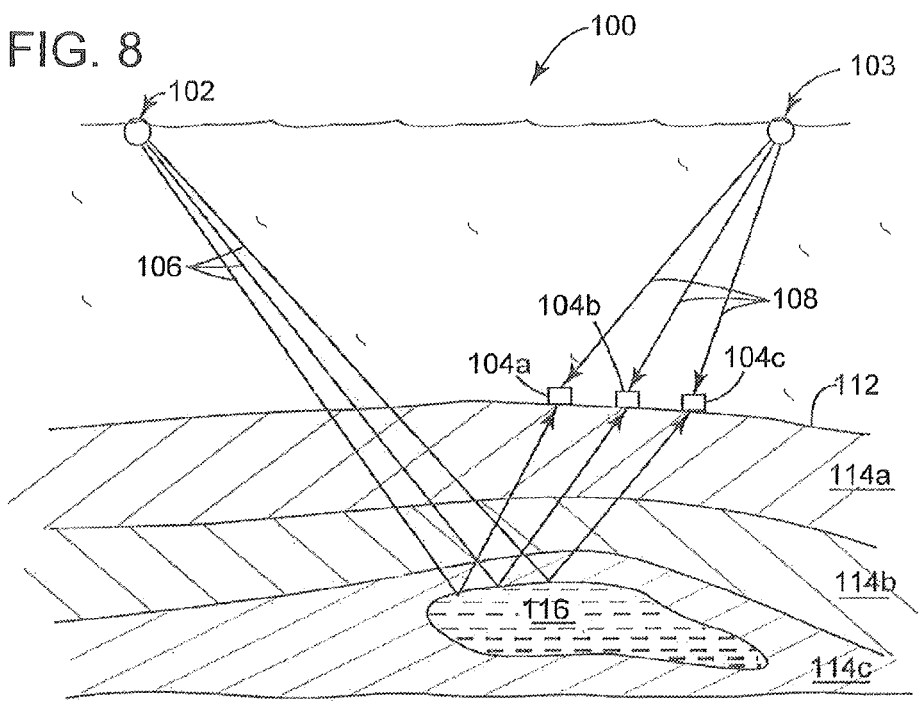
FIG. 8 illustrates a cross-sectional view of an example seismic imaging system in an off-shore environment in accordance with some embodiments of the present disclosure.
Figure 9:
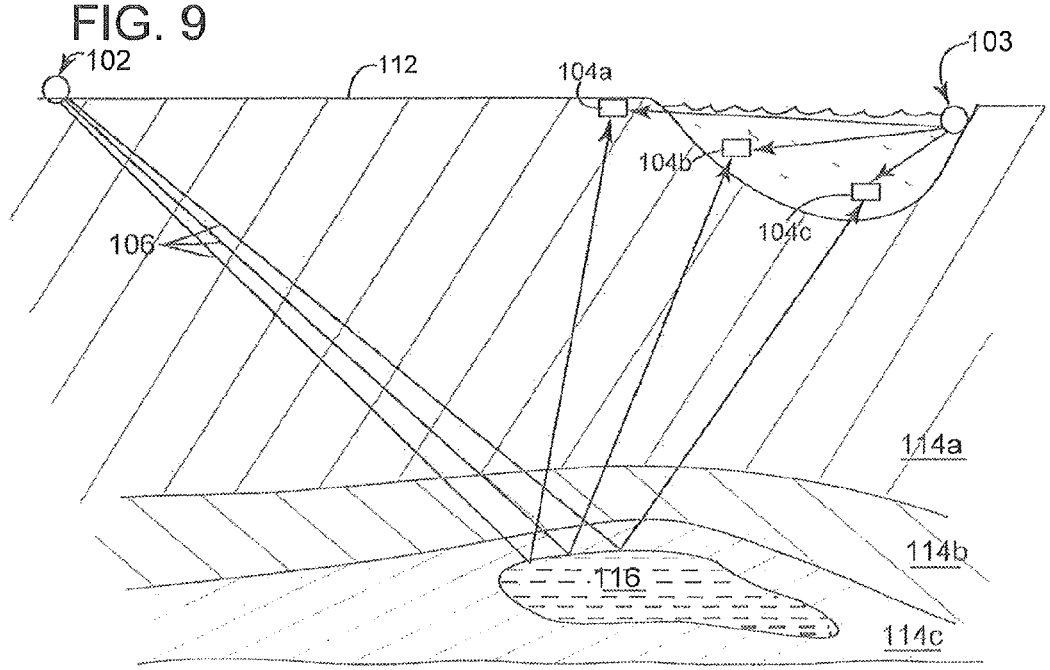
FIG. 9 illustrates a cross-sectional view of an example seismic imaging system in a transition zone in accordance with some embodiments of the present disclosure.

FIGS. 8 and 9 illustrate cross-sectional views of example seismic imaging systems in other types of survey environments. As explained above, stabilization of controlled signals based on signal variations observed in uncontrolled signals can be utilized in any type of seismic survey environment. For example, FIG. 8 illustrates an example seismic imaging system in an off-shore environment, and FIG. 9 illustrates an example seismic imaging system in a transition zone. While different survey environments may utilize different types of sources 102 or receivers 104, receive different types of controlled signals 106 or uncontrolled signals 108, the stabilization techniques described herein can be applied regardless of the particular features of the survey environment.

Figure 10:
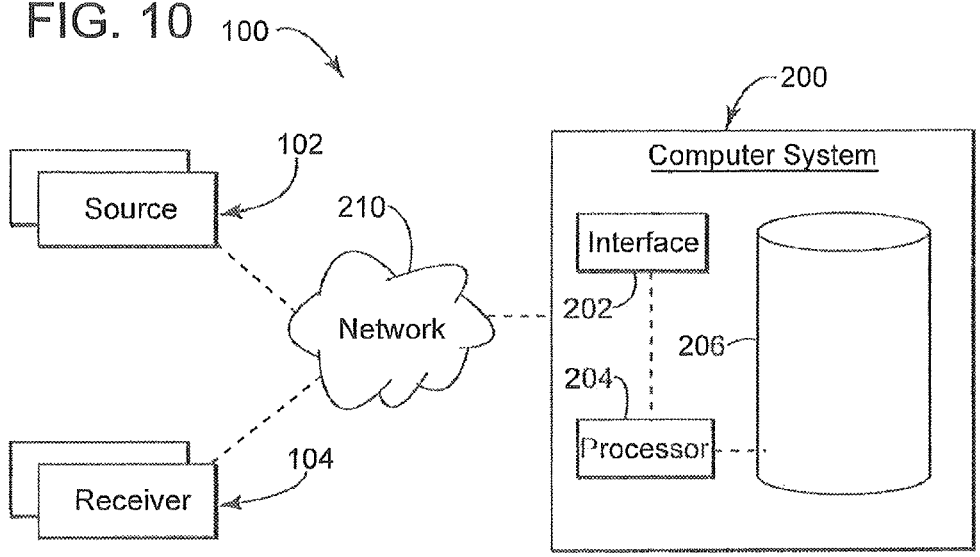
FIG. 10 illustrates a schematic view of an example seismic imaging system in accordance with some embodiments of the present disclosure.

FIG. 10 illustrates a schematic of an example system 100 that can be used to stabilize controlled signals based on uncontrolled signals. System 100 includes sources 102, receivers 104, and computer system 200, which are communicatively coupled via network 210.

Computer system 200 can stabilize active seismic data generated by a wide variety of controlled sources 102. For example, computer system 200 can Operate in conjunction with controlled sources 102 having any structure, configuration, or function described above with respect to FIGS. 1, 2, 6, and 7. In particular embodiments, sources 102 are impulsive (such as, for example, explosives or air guns) or vibratory. Impulsive sources may generate a short, high-amplitude seismic signal while vibratory sources may generate lower-amplitude signals over a longer period of time. Vibratory sources may be instructed, by means of a pilot signal, to generate a target seismic signal with energy at one or more desired frequencies, and these frequencies may vary over time. However, the seismic wave actually generated by vibratory source may differ from the target seismic signal.

Stabilization can also be performed in embodiments using controlled sources 102 that radiate one or more frequencies of seismic energy during predetermined time intervals. For example, some embodiments may use controlled sources 102 that generate monofrequency emissions such as, for example, certain SEISMOVIE sources. As another example, some embodiments may use controlled sources 102 that radiate varying frequencies. In such embodiments, controlled source 102 may impart energy at a starting frequency and the frequency may change over a defined interval of time at a particular rate until a stopping frequency is reached. The impartation of a range of frequencies may be referred to as a sweep, frequency sweep, or seismic sweep. The difference between the starting and stopping frequencies of the sweep may be referred to as the range of the sweep and the interval of time to sweep through the frequencies may be referred to as the sweep time. A sweep may be a downsweep, in which the stopping frequency is lower than the starting frequency. By contrast, in an upsweep the stopping frequency is higher than the starting frequency. Furthermore, a sweep may be linear such that the frequency changes linearly over the sweep time at a rate dictated by the starting and stopping frequencies and the sweep time. By contrast, in a nonlinear sweep, the frequency may vary nonlinearly between the starting and stopping frequencies over the sweep time. For example, a nonlinear sweep may include a quadratic sweep, a logarithmic sweep, or any other suitable sweep configuration. In some embodiments, a sweep may be continuous such that controlled source 102 generates substantially all the frequencies between the starting and stopping frequency. In other embodiments, the frequency is gradually increased during the sweep. The gradual increase may be substantially continuous or may use various sized steps to sweep from the starting frequency to the stopping frequency. In some embodiments, a sweep may be discontinuous so that source 102 does not generate particular frequencies between the starting and stopping frequency and receivers 104 do not receive or report data at those particular frequencies.

As explained above, stabilization of controlled signals is not limited to particular types of receivers 104. For example, in some embodiments, receivers 104 include geophones, hydrophones, accelerometers, fiber optic sensors (such as, for example, a distributed acoustic sensor (DAS)), streamers, or any suitable device. Such devices may be configured to detect and record energy waves propagating through the subsurface geology with any suitable, direction, frequency, phase, or amplitude. For example, in some embodiments, receivers 104 are vertical, horizontal, or multicomponent sensors. As particular examples, receivers 104 may comprise three component (3C) geophones, 3C accelerometers, or 3C Digital Sensor Units (DSUs). In certain marine embodiments, receivers 104 are hydrophones contained inside buoyant streamers, which may be towed behind a vessel. In such embodiments, controlled sources 102 and receivers 104 may be towed behind the same or a different vessel. Streamers may also be used in onshore survey environments. In other off-shore embodiments, receivers 104 are situated on or below the ocean floor or other underwater surface.

Computer system 200 may include any suitable devices operable to process seismic data recorded by receivers 104. Computer system 200 may be a single device or multiple devices. For example, computer system 200 may be one or more mainframe servers, desktop computers, laptops, cloud computing systems, or any suitable devices. Computer system 200 receives data recorded by receivers 104 and processes the data to calculate a stabilization factor that may be applied to controlled signals. Computer system 200 may be operable to perform the dynamic stabilization methods described above with respect to FIG. 7. Computer system 200 may also be operable to coordinate or otherwise control or manage controlled sources 102. Computer system 200 may be communicatively coupled to receivers 104 via network 210 during the recording process, or it may receive the recorded data after the collection is complete. In the illustrated embodiment, computer system 200 includes network interface 202, processor 204, and memory 206.

Network interface 202 represents any suitable device operable to receive information from network 210, transmit information through network 210, perform suitable processing of information, communicate with other devices, or any combination thereof. Network interface 202 may be any port or connection, real or virtual, including any suitable hardware and/or software (including protocol conversion and data processing capabilities) to communicate through a LAN, WAN, or other communication system that allows computer system 200 to exchange information with network 210, other software computer systems 200, controlled sources 102, receivers 104, and/or other components of system 100. Computer system 200 may have any suitable number, type, and/or configuration of network interface 202.

Processor 204 communicatively couples to network interface 202 and memory 206 and controls the operation and administration of computer system 200 by processing information received from network interface 202 and memory 206. Processor 204 includes any hardware and/or software that operates to control and process information. In some embodiments, processor 204 may be a programmable logic device, a microcontroller, a microprocessor, any suitable processing device, or any suitable combination of the preceding. Computer system 200 may have any suitable number, type, and/or configuration of processor 204. Processor 204 may execute one or more sets of instructions to implement dynamic stabilization of seismic data, including the steps described above with respect to FIG. 7. Processor 204 may also execute any other suitable programs to facilitate the data stabilization such as, for example, user interface software to present one or more GUIs to a user.

Memory 206 stores, either permanently or temporarily, data, operational software, or other information for processor 204, other components of computer system 200, or other components of system 100. Memory 206 includes any one or a combination of volatile or nonvolatile local or remote devices suitable for storing information. For example, memory 206 may include random access memory (RAM), read only memory (ROM), flash memory, magnetic storage devices, optical storage devices, network storage devices, cloud storage devices, solid state devices, external storage devices, or any other suitable information storage device or a combination of these devices. Memory 206 may store information in one or more databases, file systems, tree structures, any other suitable storage system, or any combination thereof. Furthermore, different types of information stored in memory 206 may use any of these storage systems. Moreover, any information stored in memory may be encrypted or unencrypted, compressed or uncompressed, and static or editable. Computer system 200 may have any suitable number, type, and/or configuration of memory 206. Memory 206 may include any suitable information for use in the operation of computer system 200. For example, memory 206 may store computer-executable instructions operable to perform the steps discussed above with respect to FIGS. 1-7 when executed by processor 204. Memory 206 may also store any seismic data or related data such as, for example, raw seismic data, reconstructed signals, velocities, amplitudes, signal variations, stabilization factors, or any other suitable information.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another Suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 202, one or more portions of processor 204, one or more portions of memory 206, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. For example, while the embodiments of FIGS. 1, 2, 8, and 9 illustrate particular configurations of controlled sources 102 and receivers 104, any suitable number, type, and configuration may be used. As another example, any suitable method of calculating reconstructed signals may be used in certain embodiments. As yet another example, while this disclosure describes certain data processing operations that may be performed using the components of system 100, any suitable data processing operations may be performed where appropriate. Furthermore, certain embodiments may alternate between or combine one or more data processing operations described herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for stabilizing seismic signals, the method comprising:

calculating one or more first reconstructed signals associated with a first receiver of a plurality of receivers, wherein each first reconstructed signal is based at least on first uncontrolled signals recorded by a respective pair of receivers, the respective pair of receivers comprising the first receiver and a respective second receiver of the plurality of receivers;

calculating one or more first signal variations, wherein each first signal variation is associated with a respective pair of receivers and based at least on a difference between the first reconstructed signal associated with the respective pair of receivers and a reference associated with the respective pair of receivers;

calculating a first stabilization factor for the first receiver based at least on the one or more first signal variations; and modifying one or more first controlled seismic signals recorded by the first receiver by applying the first stabilization factor to the one or more first controlled seismic signals.

2. The method of claim 1, further comprising:

calculating one or more second reconstructed signals associated with the first receiver, wherein each second reconstructed signal is based at least on second uncontrolled signals recorded by a respective pair of receivers, the respective pair of receivers comprising the first receiver and a respective second receiver of the plurality of receivers;

calculating one or more second signal variations, wherein each second signal variation is associated with a respective pair of receivers and based at least on a difference between the second reconstructed signal associated with the respective pair of receivers and a reference associated with the respective pair of receivers;

calculating a second stabilization factor for the first receiver based at least on the one or more second signal variations; and modifying one or more second controlled seismic signals recorded by the first receiver by applying the second stabilization factor to the one or more second controlled seismic signals, wherein the first uncontrolled signals and the first controlled signals are recorded by the plurality of receivers during a first time window, and the second uncontrolled signals and the second controlled signals are recorded by the plurality of receivers during a second time window.

3. The method of claim 1, wherein each reconstructed signal is calculated using one of the following calculations:

cross-correlation of the uncontrolled signal recorded by the first receiver and the uncontrolled signal recorded by the respective second receiver;

convolution of the uncontrolled signal recorded by the first receiver and the uncontrolled signal recorded by the respective second receiver; or deconvolution of the uncontrolled signal recorded by the first receiver and the uncontrolled signal recorded by the respective second receiver.

4. The method of claim 1, wherein each first signal variation comprises one or more of the following variations:

a velocity variation between the reference and the first reconstructed signal associated with the respective pair of receivers; and an amplitude variation between the reference and the first reconstructed signal associated with the respective pair of receivers.

5. The method of claim 1, wherein the reference is a reference signal calculated based at least on one or more previously-recorded signals.

6. The method of claim 1, wherein calculating the one or more first reconstructed seismic signals comprises:

calculating one or more preprocessed signals, each preprocessed signal calculated based on one of the first uncontrolled signals using one or more of the following preprocessing techniques:
data beamforming; and
velocity filtering, and
calculating the one or more first reconstructed seismic signals based at least on the one or more preprocessed seismic signals.

7. The method of claim 1, wherein the first stabilization operator is applied to the one or more first controlled seismic signals in the time domain.

8. The method of claim 1, wherein the first stabilization operator is applied to the one or more first controlled seismic signals in the frequency domain.

9. A system for stabilizing seismic signals, the system comprising:

a plurality of receivers; and
a computer system configured to:
calculate one or more first reconstructed signals associated with a first receiver of the plurality of receivers, wherein each first reconstructed signal is based at least on first uncontrolled signals recorded by a respective pair of receivers, the respective pair of receivers comprising the first receiver and a respective second receiver of the plurality of receivers;

calculate one or more first signal variations, wherein each first signal variation is associated with a respective pair of receivers and based at least on a difference between the first reconstructed signal associated with the respective pair of receivers and a reference associated with the respective pair of receivers;

calculate a first stabilization factor for the first receiver based at least on the one or more first signal variations; and modify one or more first controlled seismic signals recorded by the first receiver by applying the first stabilization factor to the one or more first controlled seismic signals.

10. The system of claim 9, wherein the computer system is further configured to:

calculate one or more second reconstructed signals associated with the first receiver, wherein each second reconstructed signal is based at least on second uncontrolled signals recorded by a respective pair of receivers, the respective pair of receivers comprising the first receiver and a respective second receiver of the plurality of receivers;

calculate one or more second signal variations, wherein each second signal variation is associated with a respective pair of receivers and based at least on a difference between the second reconstructed signal associated with the respective pair of receivers and a reference associated with the respective pair of receivers;

calculate a second stabilization factor for the first receiver based at least on the one or more second signal variations; and modify one or more second controlled seismic signals recorded by the first receiver by applying the second stabilization factor to the one or more second controlled seismic signals, wherein the first uncontrolled signals and the first controlled signals are recorded by the plurality of receivers during a first time window, and the second uncontrolled signals and the second controlled signals are recorded by the plurality of receivers during a second time window.

11. The system of claim 9, wherein each reconstructed signal is calculated using one of the following calculations:

cross-correlation of the uncontrolled signal recorded by the first receiver and the uncontrolled signal recorded by the respective second receiver;

convolution of the uncontrolled signal recorded by the first receiver and the uncontrolled signal recorded by the respective second receiver; or deconvolution of the uncontrolled signal recorded by the first receiver and the uncontrolled signal recorded by the respective second receiver.

12. The system of claim 9, wherein each first signal variation comprises one or more of the following variations:

a velocity variation between the reference and the first reconstructed signal associated with the respective pair of receivers; and an amplitude variation between the reference and the first reconstructed signal associated with the respective pair of receivers.

13. The system of claim 9, wherein the reference is a reference signal calculated based at least on one or more previously-recorded signals.

14. The system of claim 9, wherein the computer system is configured to calculate the one or more first reconstructed seismic signals by:
　　calculating one or more preprocessed signals, each preprocessed signal calculated based on one of the first uncontrolled signals using one or more of the following preprocessing techniques:
　　　data beamforming; and
　　　velocity filtering, and
　　calculating the one or more first reconstructed seismic signals based at least on the one or more preprocessed seismic signals.

15. The system of claim 9, wherein the first stabilization operator is applied to the one or more first controlled seismic signals in the time domain or the frequency domain.

16. A non-transitory computer-readable medium containing instructions for stabilizing seismic signals, the instructions being operable, when executed by a processor, to:
　　calculate one or more first reconstructed signals associated with a first receiver of a plurality of receivers, wherein each first reconstructed signal is based at least on first uncontrolled signals recorded by a respective pair of receivers, the respective pair of receivers comprising the first receiver and a respective second receiver of the plurality of receivers;
　　calculate one or more first signal variations, wherein each first signal variation is associated with a respective pair of receivers and based at least on a difference between the first reconstructed signal associated with the respective pair of receivers and a reference associated with the respective pair of receivers;
　　calculate a first stabilization factor for the first receiver based at least on the one or more first signal variations; and
　　modify one or more first controlled seismic signals recorded by the first receiver by applying the first stabilization factor to the one or more first controlled seismic signals.

17. The medium of claim 16, wherein the instructions are further operable, when executed by the processor, to:
　　calculate one or more second reconstructed signals associated with the first receiver, wherein each second reconstructed signal is based at least on second uncontrolled signals recorded by a respective pair of receivers, the respective pair of receivers comprising the first receiver and a respective second receiver of the plurality of receivers;
　　calculate one or more second signal variations, wherein each second signal variation is associated with a respective pair of receivers and based at least on a difference between the second reconstructed signal associated with the respective pair of receivers and a reference associated with the respective pair of receivers;
　　calculate a second stabilization factor for the first receiver based at least on the one or more second signal variations; and
　　modify one or more second controlled seismic signals recorded by the first receiver by applying the second stabilization factor to the one or more second controlled seismic signals,
　　wherein the first uncontrolled signals and the first controlled signals are recorded by the plurality of receivers during a first time window, and the second uncontrolled signals and the second controlled signals are recorded by the plurality of receivers during a second time window.

18. The medium of claim 16, wherein each reconstructed signal is calculated using one of the following calculations:
　　cross-correlation of the uncontrolled signal recorded by the first receiver and the uncontrolled signal recorded by the respective second receiver;
　　convolution of the uncontrolled signal recorded by the first receiver and the uncontrolled signal recorded by the respective second receiver; or
　　deconvolution of the uncontrolled signal recorded by the first receiver and the uncontrolled signal recorded by the respective second receivers.

19. The medium of claim 16, wherein each first signal variation comprises one or more of the following variations:
　　a velocity variation between the reference and the first reconstructed signal associated with the respective pair of receivers; and
　　an amplitude variation between the reference and the first reconstructed signal associated with the respective pair of receivers.

20. The medium of claim 16, wherein the reference is a reference signal calculated based at least on one or more previously-recorded signals.

* * * * *